United States Patent [19]
Kessler

[11] 4,038,936
[45] Aug. 2, 1977

[54] CONDITION CHANGE INDICATOR

[76] Inventor: Jane R. Kessler, 115 Pinewood Drive, Downington, Pa. 19335

[21] Appl. No.: 621,016

[22] Filed: Oct. 9, 1975

[51] Int. Cl.² .................. G01K 11/06; G01K 11/08
[52] U.S. Cl. ................................. 116/114.5; 73/358
[58] Field of Search ................ 116/114.5, 114 Y; 73/358; 426/88; 251/309, 327

[56] References Cited

U.S. PATENT DOCUMENTS

| 307,220 | 10/1884 | Peters | 251/309 |
|---|---|---|---|
| 577,924 | 3/1897 | Libbey | 251/327 |
| 3,665,770 | 5/1972 | Sagi | 116/114.5 |
| 3,677,088 | 7/1972 | Lang | 73/358 |
| 3,712,141 | 1/1973 | Chadha | 73/358 |

Primary Examiner—S. Clement Swisher
Assistant Examiner—Denis E. Corr
Attorney, Agent, or Firm—Weiser, Stapler & Spivak

[57] ABSTRACT

Two communicating chambers hold distinctively different materials or substances. An arming device separates them till ready for use. After arming, either the frozen state of the fluid in the lower chamber, or an unmelted plug between the chambers prevents the mixing of the substances until the temperature change to be indicated has taken place.

17 Claims, 11 Drawing Figures

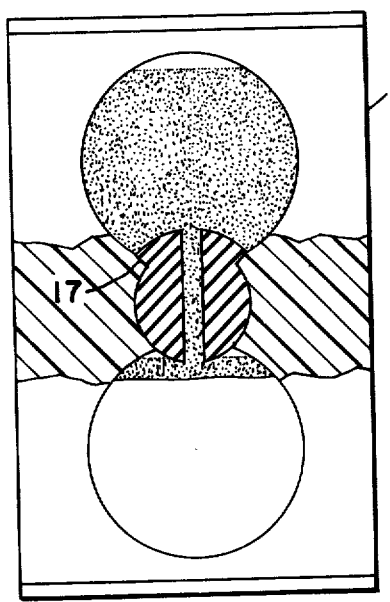
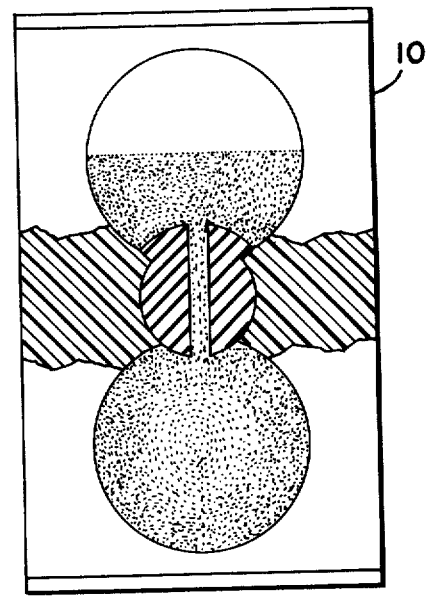
FIG. 5          FIG. 6
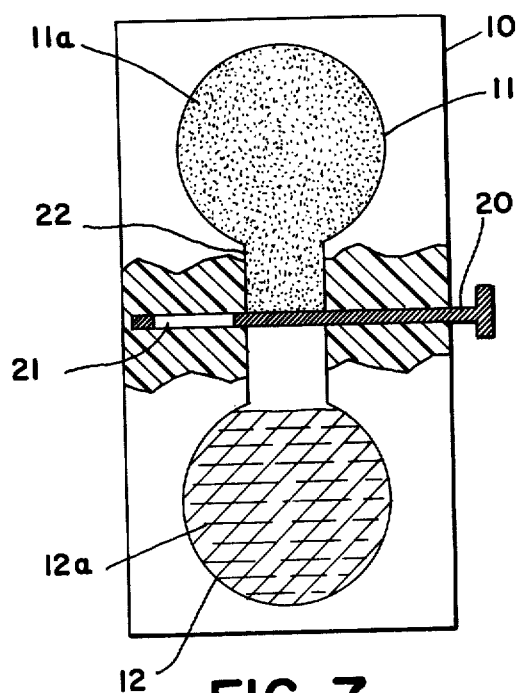
FIG. 7

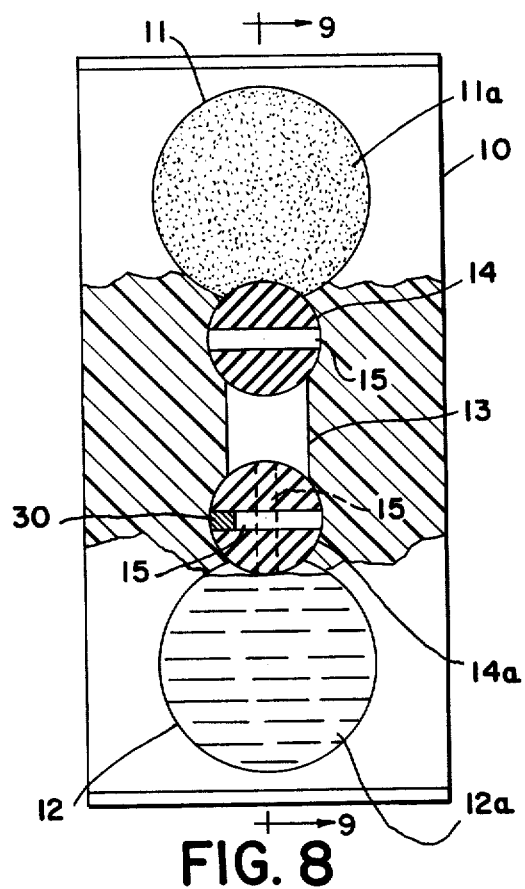 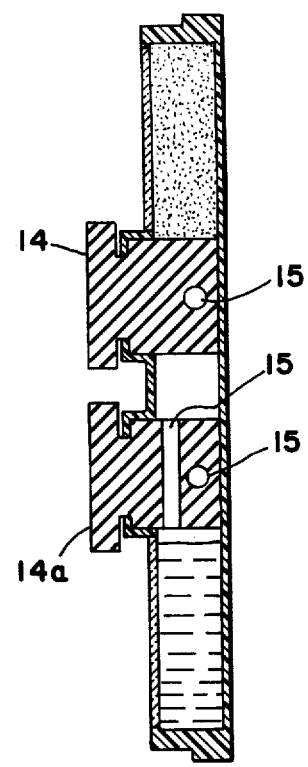
FIG. 8  FIG. 9
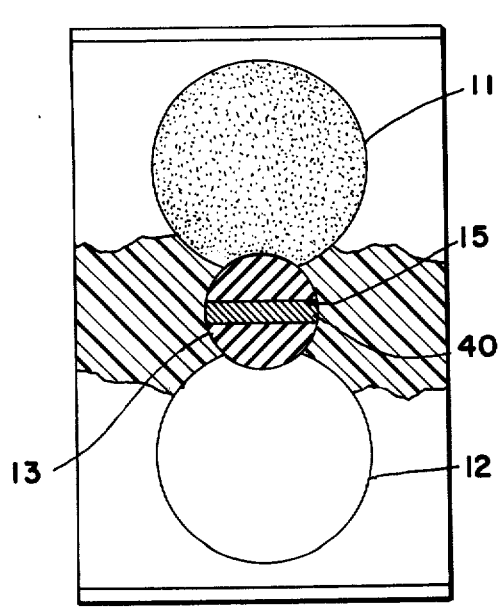 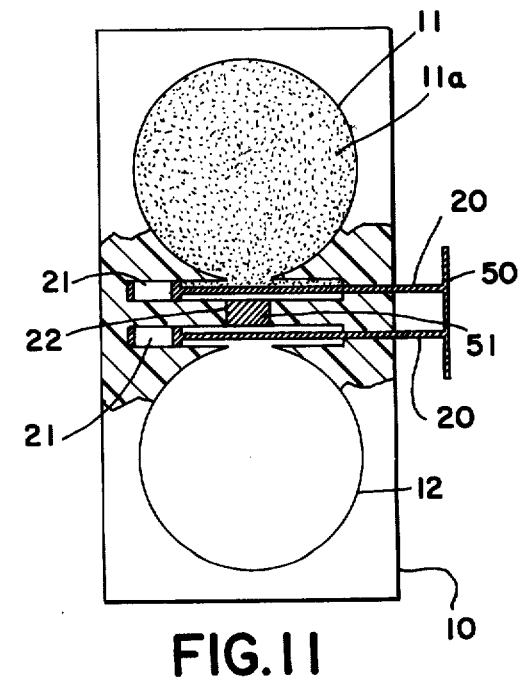
FIG. 10  FIG. 11

CONDITION CHANGE INDICATOR

This invention relates to improvements in apparatus for indicating changes in ambient temperature conditions.

There are many situations, in industry and commerce, in which it is desirable to maintain ambient temperatures within certain limits. For example, in the storage and transportation of certain perishables, it is necessary to maintain a certain degree of refrigeration, but without going below the freezing point. Conversely, for frozen foods, it is necessary to prevent the ambient temperature from rising above the freezing point. In still other situations, it is necessary to maintain temperatures above freezing, but also below some other, much higher temperature level.

In many of these situations, it is impractical to maintain continuous monitoring of temperature. Human surveillance is often completely out of the question because the goods are in transit, or in inaccessible locations, and also because of the high cost. Other conventional mechnanical, or electromechanical monitoring devices, such as temperature chart recorders, are also prohibitively costly in relation to the value of the goods to be protected. Moreover, for many applications they are much more sophisticated than necessary, which needlessly raises their cost. These applications are the ones in which it is not necessary to know the details of whatever temperature variations the foods may have been exposed to, but only whether or not this temperature has gone beyond some limiting value during the surveillance period.

For example, for frozen orange juice it may be enough to know whether the ambient temperature during shipment has or has not risen above the freezing point. Conversely, for fresh oranges, it may be enough to know whether or not the ambient temperature has fallen below freezing.

For such applications, various devices have been proposed which are so constructed as to exhibit a distinctive and irreversible change (e.g., of color) when subjected to the undesired ambient temperature transition. By installing such devices on or near the foods to be kept under surveillance, it was hoped that it would be possible to tell, at a later time, whether they had or had not been exposed to the unwanted temperature conditions.

Examples of exemplary prior art condition change indicators may be found in U.S. Pat. Nos. 2,768,602, 2,787,238, 2,918,893, 3,067,015, 3,084,658, 3,207,122, 3,467,053, 3,545,400, 3,518,961, 3,618,558, 3,665,770, 3,688,734, 3,724,360, 3,765,243, 3,786,777, and 3,844,718.

Such prior art devices have suffered from a variety of shortcomings, as to complexity, reliability, sensitivity, and so forth. For reasons such as these they have not heretofore been used as widely as might otherwise be expected.

Accordingly, it is a primary object of the invention to provide a temperature indicator of the type under consideration, but free from one or more of the drawbacks of prior art devices.

It is another object to provide a device for indicating that the ambient temperature has or has not gone from one side to the other of a given limiting value.

It is still another object to provide a device which gives a permanent indication that the ambient temperature has gone from one side to the other of a given limiting value.

It is a still further object of the invention to provide a device for indicating that the ambient temperature has gone from below to above freezing.

It is a still further object to provide a device for indicating the ambient temperature has gone from above to below freezing.

It is a still further object to provide a device for indicating that the ambient temperature has risen above a predetermined elevated temperature.

It is a still further object to provide such a device which is simple and reliable.

These and other objects which will appear are achieved in accordance with the invention by an indicator which has two chambers, one of which contains a substance that is distinctively different from any in the other chamber. An arming device is positioned so as to keep the two chambers normally out of communication with each other. This arming device is controllable to permit such communication between chambers to be established.

The indicator is so positioned and the substance in each chamber is so chosen that, provided arming has also taken place, a transition in ambient temperature from one side to the other of a predetermined limit will cause the substance in the one chamber to enter the other chamber. This will be accompanied by a distinctive and irreversible change in appearance within the other chamber.

Preferably each chamber is in the shape of a flat, hollow disc with transparent face. The two discs are connected by a duct which is initially sealed off by the arming device.

The two discs can be mounted on a common, flat support, by means of which they can be attached to a product to be kept under surveillance, or to the wall of an enclosure whose contents are to be kept under temperature surveillance.

The discs are preferably positioned one above the other, so that the substance in one can pass into the other under the influence of gravity, once the arming device has been activated and the temperature transistion taken place.

For further details, reference is made to the discussion which follows, in the light of the accompanying drawings wherein.

Figure 1:
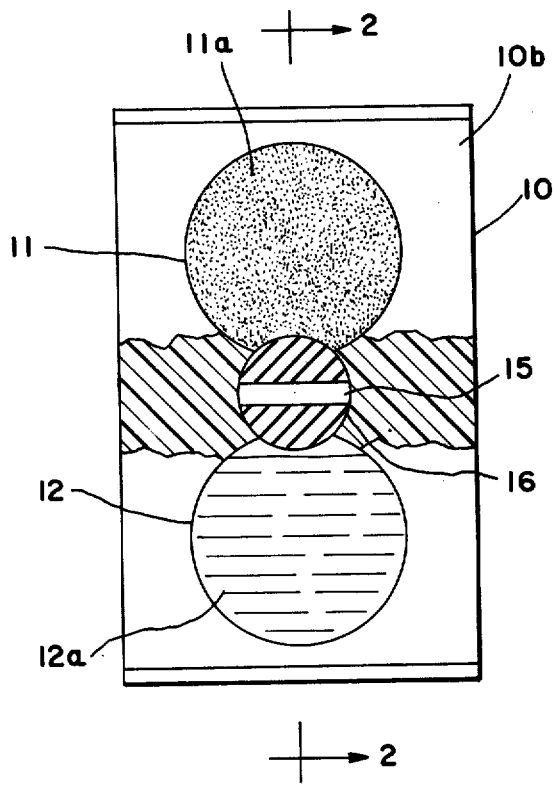
FIG. 1 is a front elevational view.
Figure 2:
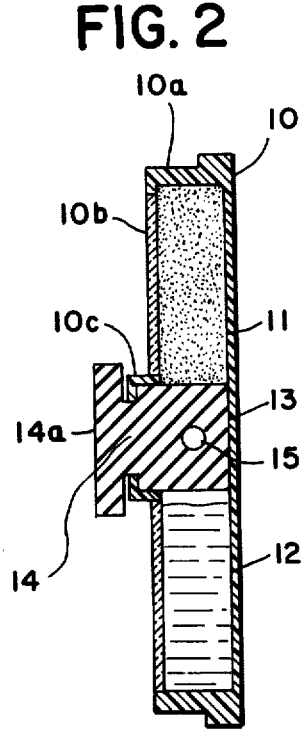
FIG. 2 is a cross-sectional view, taken through 2—2 of FIG. 1, of an embodiment of the invention for indicating temperature transition from below to above freezing.
Figure 3:
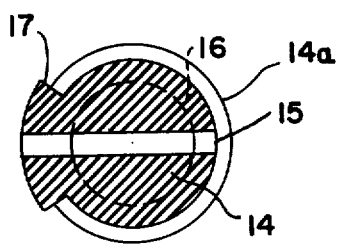
Figure 4:
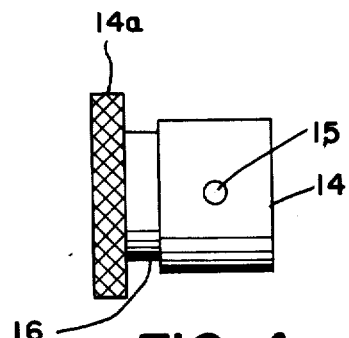

FIGS. 3 and 4 respectively show cross section and side elevations of the arming device of the embodiment of FIGS. 1 and 2 when removed from the overall indicator;

FIG. 5 shows the same embodiment as FIG. 1, but after arming;

FIG. 6 shows the same indicator as FIGS. 1 and 5, but after both arming and the temperature transistion from below to above freezing have taken place;

FIG. 7 shows a front elevation of an alternative embodiment of the invention of FIGS. 1 to 6 using a different arming device;

FIG. 8 is a front elevation, and

FIG. 9 a cross-section through 9—9 of FIG. 8 of an embodiment of the invention for indicating temperature transistion from above to below freezing;

FIG. 10 is a front elevation of an embodiment of the invention for indicating temperature transistion above a predetermined elevated temperature; and FIG. 11 is a front elevation of an alternative form of the embodiment of FIG. 10.

The same reference numerals are used in all the figures to denote similar elements.

Referring now to the drawings, and particularly to FIGS. 1 and 2, these show overall views of an embodiment of the invention before it has been armed and thereby rendered capable of providing an indication of the particular temperature change to be monitored.

As shown in FIGS. 1 and 2 this indicator includes a housing 10 enclosing two generally disc shaped chambers 11 and 12. A connecting duct or channel 13 is provided between these chambers. Positioned within channel 13 is a body 14 traversed by a passage 15. Body 14 is provided with a knob 14a, by means of which it is rotatable in azimuth, to position passage 15 either out of communication with chambers 11 and 12, as shown in FIGS. 1 and 2, or in communication with each of these chambers, as shown in FIGS. 5 and 6.

Housing 10 may be made of a single plastic base unit 10a, in which are formed recesses corresponding to chambers 11, 12 and channel 13. The open sides of these recesses may then be closed off by a plastic cover panel 10b, glued or sealed to base 10a at least around the periphery of the recesses 11, 12 and passage 13. This cover 10b may also have a protrusion as shown at 10c in FIG. 2 for retaining the portion of body 14 positioned within channel 13.

Body 14 is preferably made either entirely of resilient material such as rubber, or with a rubber circumferential layer 16 (see FIGS. 3 and 4). In either case, the outer rim of body 14 is preferably made with a compressible flange 17. This flange 17 is compressed within the perimeter of communicating channel 13 while body 14 is in the position shown in FIGS. 1 and 2. When the body is rotated to assume the position shown in FIGS. 5 and 6, flange 17 expandes into chamber 11 and, thereafter, it is no longer possible to rotate body 14.

Chamber 12 contains a substance 12a which is substantially solid below the freezing temperature to be monitored, but which turns to liquid at or above that temperature. For example, this substance may be plain water if the temperature transistion which it is desired to monitor is from below the freezing point of water to above that freezing point.

Chamber 11, on the other hand, contains a distinctively different substances 11a such as sand, fine glass beads, or a suitable liquid or solid solution.

With body 14 initially in the position shown in FIGS. 1 and 2, the indicator may be stored, shipped, or otherwise handled with complete disregard for temperature conditions, orientation, and so forth.

When it is desired to use the indicator, it is placed at the point of monitoring, in the upright position shown in FIGS. 1 and 2, and with the substance in the lower chamber 12 in its frozen, i.e., solid state. Once the substance in chamber 12 is frozen, the indicator may be armed by rotating body 14 so that it assumes the position shown in FIGS. 5 and 6. As shown in FIG. 5, this establishes communication between upper chamber 11 and lower chamber 12. As a result some of the substance 11a in upper chamber 11 fills passage 15 through body 14. However, passage of the remainder of this substance 11a into chamber 12 is prevented by the frozen, solid state of substance 12a in chamber 12. So long as that substance 12a remains frozen, corresponding to an ambient temperature below its freezing point, this condition of the indicator remains unchanged. Should the ambient temperature which is being monitored change, however, and rise above the freezing point of substance 12a, then the latter will thaw and become liquid. Under those conditions, it no longer represents a barrier to the passage of substance 11a from upper chamber 11 into lower chamber 12. Therefore, substance 11a will then enter chamber 12 essentially as shown in FIG. 6.

As previously noted, substance 11a is distinctively different from substance 12a so that the intermingling of the two substances which results from the thawing will give rise to a distinctively different appearance of the indicator than was the case before such mingling had taken place.

For example, if the substance 12a in chamber 12 is water and the substance 11a in chamber 11 is colored sand or fine glass beads, an obvious change in appearance of the device will take place if, while the device is armed, the water in chamber 12 assumes its liquid state and permits the sand to flow through passage 15 from upper chamber 11 into lower chamber 12. A variety of indicated temperatures can be selected by selection of suitable materials in the two chambers. For example, the material 12a in the lower chamber 12, which is intended to be frozen, can be water, a salt solution, or an organic compound of suitable freezing point. The upper chamber can be filled with an indicator substance, such as thenothaline solution while the material in the lower chamber is a base such as NaOH so that, upon mixing, a color change occurs due to chemical action.

Referring to FIG. 7, this shows what is basically the same indicator as shown in FIGS. 1 through 6, for indicating temperature transition from below to above the freezing point of substance 12a within lower chamber 12. However, a different arming device is used in FIG. 7. This consists of a wand 20 initially fully inserted in a channel 21 so positioned within housing 10 that wand 20 closes off channel 22 between upper chamber 11 and lower chamber 12. In FIG. 7 wand 20 is shown in solid lines in place to close channel 22. In this position, the indicator is disarmed and substance 11a is kept out of chamber 12 whether or not substance 12a is frozen or liquid.

To arm the embodiment of FIG. 7, wand 20 is withdrawn, after freezing the substance 12a until channel 22 is freed. Preferably the portion of wand 20 protruding beyond the edge of housing 10 is then snapped off, so that the wand cannot be inadvertently reinserted to again block channel 22. Thereafter the operation of the indicator is as previously discussed in relation to FIGS. 1 through 6.

Referring to FIGS. 8 and 9, these show an embodiment of the invention for indicating transitions from temperatures above freezing to temperatures below freezing.

The indicator is similar to that of FIGS. 1 through 6, in that it comprises a housing 10 defining upper and lower chambers 11 and 12 and a communicating channel 13 between them. However, instead of one rotatable arming body 14, as provided in the embodiment of FIG. 1, that of FIG. 8 has two arming bodies 14 and 14a. The former is positioned at the junction between upper chamber 11 and communicating channel 13 while the latter is positioned at the junction between the upper end of chamber 12 and the lower end of communicating channel 13. Body 14a differs from body 14 in that it has not only one passage 15 extending through it but rather two such passages positioned generally at right angles to each other and in different planes so that they do not intersect. One of these passages 15 in body 14a, namely that shown positioned horizontally in FIG. 8, has a plug of some slightly resilient material such as wax 30 positioned within one end of passage 15.

The indicator is shown in FIGS. 8 and 9 in its unarmed condition. The horizontal positioning of passage 15 in body 14 prevents substance 11a contained within chamber 11 from entering communicating channel 13. On the other hand, vertically oriented passage 15 in body 14a acts as a relief passage for the substance 12a contained in chamber 12, if that substance should happen to become frozen and in the process expand somewhat while the indicator is still in its unarmed condition.

The substance in 12a in chamber 12 is such that it undergoes a transition from solid to liquid state at the freezing temperature which is to be monitored.

To arm the indicator, both bodies 14 and 14a are rotated one quarter turn each so that the passages 15 which are initially horizontal are placed in a vertical position, thereby establishing communication between chambers 11 and 12 and communicating channel 13. It should be noted that plug 30 should be positioned at that end of its passage 15 which becomes uppermost upon rotation of body 14a into the armed position of the indicator.

With bodies 14 and 14a so rotated, some of the substance 11a in upper chamber 11 passes through channel 15 in body 14 but is prevented from entering lower chamber 12 by plug 30.

This condition prevails so long as the indicator is not subjected to freezing ambient temperature. If the ambient temperature does fall below the freezing point of the substance 12a in chamber 12, that substance will expand and force plug 30 up and out of passage 15 within which it is positioned. This will then complete the communication between upper chamber 11 and lower chamber 12 with the same result as in other embodiments of the invention when this communication is completed. However, it should be noted that substance 11a from chamber 11 will still be kept out of lower chamber 12 by the frozen state of substance 12a contained therein. When the temperature to which the indicator is subjected again rises above freezing this substance 12a melts and, since there is nothing in its way, substance 11a will enter chamber 12 with the same results as are encountered in other embodiments under the same conditions.

FIG. 10 to which reference may now be had, shows an embodiment which is suitable for detecting transitions in ambient temperature of a predetermined high temperature level. This embodiment differs from that of FIG. 1, for example, only in that the substances 11a and 12a within chambers 11 and 12 should be suitable for use at the elevated temperatures involved and in that passage 15 is filled with a suitable substance 40 which is substantially solid at temperatures below the predetermined transistion temperature, while becoming substantially fluid above that level. For example, substance 40 may be a suitable wax material. It is known that a variety of wax materials can be used for a variety of specific temperatures. In its unarmed condition, which is shown in FIG. 10, body 14 is rotated so that passage 15 is horizontal. Thereupon, the temperature to which the indicator device is subjected can vary at will and chambers 11 and 12 will still remain out of communication. Even if the wax material 40 within passage 15 melts, it will be prevented from escaping from passage 15 by the orientation of that passage out of communication with chambers 11 and 12. To arm the indicator, body 14 is rotated to align passage 15 with chambers 11 and 12. Thereafter, transition of the ambient temperature from below the predetermined value to above that value will cause the wax material 40 to melt and flow into lower chamber 12 thereby freeing the passage into that chamber for material 11a from upper chamber 11. Such entry of material 11a into lower chamber 12 will manifest itself in the manner previously discussed with respect to other embodiments.

FIG. 11, to which reference can now be had, shows an indicator device also suitable for indicating transitions from below to above a predetermined elevated temperature but of a different form than that of FIG. 10. More specifically, the device of FIG. 11 is generally similar to that of FIG. 7, except that there are in FIG. 11 two channels 21 positioned across communicating channel 22 provided between upper chamber 11 and lower chamber 12. Within each channel 21 there is also positioned a wand 20. Preferably, each wand is adapted to close off channel 22 when fully inserted into its channel 21, and to free channel 22 when retracted from channel 21. Preferably, wands 20 are connected in the embodiment of FIG. 11 by a common handle 50 by means of which they can be simultaneously withdrawn from their respective channels 21. Between channels 21 in FIG. 11 a plug 51 of a material, which is substantially solid below the predetermined transition temperature and becomes substantially fluid above that temperature, is positioned. This plug may be of wax material appropriately chosen for the purpose. In its unarmed state as shown in FIG. 11, wands 20 are fully inserted in their respective channels 21 so as to seal wax material 51 between them and prevent substance 11a from passing through passage 22 and into chamber 12 whether or not the indicator is above the predetermined transition temperature. Wax material 51 is retained between wands 50 even above this predetermined transition temperature so long as wands 20 remain inserted in channels 21.

To arm the device, wands 20 are withdrawn from respective channels 21 sufficiently to free channel 22 from obstruction by these wands. Preferably, the wands 20 are then broken off outside housing 10 to prevent inadvertent reinsertion of the wands to form obstructions in channel 22.

Thereafter, temperature transition from below to above the predetermined value causes wax material 51 to become fluid and leave channel 22. This in turn enables substance 11a from chamber 11 to enter chamber 12 leading to the manifestations which have been discussed with respect to other embodiments.

It will be understood that still other variations and embodiments of the invention will occur to those skilled in the art without departing from the inventive concept.

I claim:
1. A temperature indicator comprising:
   a pair of chambers;
   channel means extended between said chambers to provide communication therebetween;
   valve means to be placed in two positions in said channel means, in a first position of which it closes the channel means and in the second position of which it does not,
   said valve means comprising non-return means to prevent placing the valve means in the first posi- tion after it has been placed in the second position; and means responsive to different temperatures to permit or prevent entry into one chamber of substance supplied from the other chamber via the channel means.

2. The temperature indicator of claim 1 wherein the valve means is a body with an internal passage, displaceable from the first position in which the passage is not in alignment with the channel means to the second position in which it is in alignment.

3. The indicator of claim 2 wherein the valve means comprises two bodies spaced along the channel means, each having a passage and each being displaceable from a position in which its respective passage is not in alignment in one in which it is in alignment with the channel means.

4. The indicator of claim 2 wherein the body is displaceable by sliding the body in a plane that is angularly oriented relative to the longitudinal axis of the channel means.

5. The indicator of claim 2 wherein the body is displaceable by rotation of at least a part of the body within the channel means.

6. The indicator of claim 2 wherein the non-return means comprises a compressible flange, at least a portion of said flange being compressed within the channel means when the valve means is in the first position.

7. The indicator of claim 6 wherein one of said chambers contains, while the valve means is in non-aligned position, the first substance which is capable of changing between the solid and the fluid states at a predetermined temperature.

8. The indicator of claim 7 wherein the other chamber contains, while the valve means is in its non-aligned position, a second substance distinctively different from that in the one chamber.

9. The indicator of claim 8 wherein the first and second substances are such that their mixture is distinctively different from the first substance.

10. The indicator of claim 8 wherein the second substance is capable of flowing into the second chamber at temperatures above and below the predetermined temperature.

11. The indicator of claim 6 wherein at least a portion of the flange expands into one of said chambers when the valve means is in the said second position to prevent the valve means from being returned to the first position.

12. The indicator of claim 7 wherein the first substance changes from a solid to a fluid at the predetermined temperature.

13. The indicator of claim 7 wherein the first substance changes from a fluid to a solid at the predetermined temperature.

14. A temperature indicator comprising:
a pair of chambers;
means to provide communication between said chambers;
means to be placed in two positions with respect to the communication providing means
in one position of which it closes the communication providing means and in the other of which it does not,
the two-position means comprising a body with an internal passage, displaceable from a position in which the passage is not in alignment with the communication providing means to one in which it is in alignment,
means for making the displacement irreversible;
means responsive to different temperatures to permit or prevent entry into one chamber of substance supplied from the other chamber via the communication means;
a first of said pair of chambers containing, while the two-position means is in non-aligned position, a first substance which is capable of changing between the solid and the fluid states at a predetermined temperature;
the second of said pair of chambers containing, while the two-position means is in its non-aligned position, a second substance distinctly different from that in the first chamber,
the second substance is capable of flowing into the second chamber at temperatures above and below the predetermined temperature,
the second substance being a finely divided solid as colored sand or fine glass beads.

15. A temperature indicator comprising:
a pair of chambers;
channel means to provide communication between said chambers;
valve means to be placed in two positions with respect to the channel means, a first position of which it closes the channel means and in the second position of which it does not,
said valve means comprising a body with an internal passage, said body being displaceable from the first position in which the passage is not in alignment with the channel means to the second position in which it is in alignment,
said valve means further comprising a plug positioned in the passage and constructed so as to be solid below a predetermined temperature and fluid above that temperature; and
means responsive to different temperatures to permit or prevent entry into one chamber of substance supplied from the other chamber via the channel means.

16. A temperature indicator comprising:
a pair of chambers;
channel means to provide communication between said chambers;
valve means to be placed in two positions with respect to the channel means, a first position of which it closes the channel means and in the second position of which it does not,
said valve means comprising a body with an internal passage, said body being displaceable from the first position in which the passage is not in alignment with the channel means to the second position in which it is in alignment,
said valve means further comprising a plug positioned in the passage and adapted to be expelled therefrom by expansion the substance in one of said chambers; and
means responsive to different temperatures to permit or prevent entry into one chamber of substance supplied from the other chamber via the channel means.

17. A temperature indicator comprising:
a pair of chambers;
channel means to provide communication between said chambers;

valve means to be placed in two positions with respect to the channel means, a first position of which it closes the channel means and in the second position of which it does not, said valve means comprising a body with an internal passage, said body being displaceable from the first position in which the passage is not in alignment with the channel means to the second position in which it is in alignment, said valve means comprising two bodies spaced along the channel means, each having a passage and each being displaceable from a position in which its respective passage is not in alignment to one in which it is in alignment with the channel means, said valve means comprising a plug positioned between the two bodies in channel means and constructed to be solid below a predetermined temperature and fluid above that temperature; and means responsive to different temperatures to permit or prevent entry into one chamber of substance supplied from the other chamber via the channel means.

* * * * *